(12) United States Patent
Abbott et al.

(10) Patent No.: US 8,097,199 B2
(45) Date of Patent: Jan. 17, 2012

(54) MOLDED PLASTIC CONTAINER AND PREFORM HAVING INSERT-MOLDED INSERT

(75) Inventors: Douglas W. Abbott, Bowling Green, OH (US); Bruce A. Mohrmann, Waterville, OH (US)

(73) Assignee: Rexam Healthcare Packaging Inc., Perrysburg, OH (US)

( * ) Notice: Subject to any disclaimer, the term of this patent is extended or adjusted under 35 U.S.C. 154(b) by 1256 days.

(21) Appl. No.: 11/348,662

(22) Filed: Feb. 7, 2006

(65) Prior Publication Data

US 2007/0182562 A1 Aug. 9, 2007

(51) Int. Cl.
*B29C 45/14* (2006.01)
(52) U.S. Cl. .................. 264/272.15; 264/275; 264/500; 264/523
(58) Field of Classification Search ............. 264/272.15, 264/275, 259, 500, 523
See application file for complete search history.

(56) References Cited

U.S. PATENT DOCUMENTS

| | | | | |
|---|---|---|---|---|
| 3,717,544 | A | * | 2/1973 | Valyl ........................ 220/62.22 |
| 3,919,374 | A | | 11/1975 | Komendowski |
| 4,708,630 | A | | 11/1987 | Hammond |
| 5,511,966 | A | * | 4/1996 | Matsui ........................ 425/522 |
| 6,226,619 | B1 | | 5/2001 | Halperin et al. |
| 6,251,323 | B1 | * | 6/2001 | Hoedl et al. .................. 264/254 |
| 6,302,461 | B1 | | 10/2001 | Debras et al. |
| 2001/0021356 | A1 | | 9/2001 | Konrad |
| 2003/0043039 | A1 | | 3/2003 | Salemi et al. |
| 2003/0235027 | A1 | | 12/2003 | Smeyak et al. |
| 2004/0238623 | A1 | * | 12/2004 | Asp ........................ 235/380 |

(Continued)

FOREIGN PATENT DOCUMENTS

DE 9417863.1 1/1995

(Continued)

OTHER PUBLICATIONS

Elsila, Martti, Mika Sulasari, "Method for providing a transport or storage structure with a remote-readable escort memory and a transport or storage structure" WO 93/24381, PCTFI93/00225, Published Dec. 9, 1993.*

(Continued)

*Primary Examiner* — Christina Johnson
*Assistant Examiner* — Galen Hauth
(74) *Attorney, Agent, or Firm* — Reising Ethington PC

(57) ABSTRACT

A method of making a plastic container having an RFID tag in a wall of the container includes providing a mold having a mold core and mounting an insert on the core. The insert includes an RFID tag surrounded by a plastic housing, which preferably is retained on the core for example by heat of the core partially melting the housing. A plastic preform is formed in the mold around the core and the insert, preferably by injection molding, such that the insert is embedded in a wall of the preform. The preform is then blow molded into a plastic container having the insert embedded in a wall of the container. The insert preferably is mounted on an end of the core such that the insert is in the base wall of the container following blow molding. The RFID tag preferably is externally covered by plastic material in the preform as molded, and in the container as blow molded, so that the RFID tag is not externally exposed in the preform or the container. The disclosure also contemplates a container preform and a blow molded plastic container manufactured in accordance with a method of the disclosure.

19 Claims, 3 Drawing Sheets

U.S. PATENT DOCUMENTS

| | | |
|---|---|---|
| 2005/0068182 A1 | 3/2005 | Dunlap et al. |
| 2005/0099304 A1 | 5/2005 | Humphrey |

FOREIGN PATENT DOCUMENTS

| | | |
|---|---|---|
| DE | 20214099 U1 | 1/2003 |
| EP | 1491317 A1 | 12/2004 |
| WO | WO 93/24381 | 12/1993 |

OTHER PUBLICATIONS

Collins, Jonathan, "Rafsec Debuts Packaging RFID Tag" RFID Journal Inc., Sep. 18, 2003, Available online at http://web.archive.org/web/20030920054334/http://www.rfidjournal.com/article/articleview/577/1/1/.*

Drobny, Jiri George Handbook of Thermoplastic Elastomers.. William Andrew Publishing/Plastics Design Library. p. 102-103 Online version available at: http://knovel.com/web/portal/browse/display?_EXT_KNOVEL_DISPLAY_bookid=2043&VerticalID=.*

International Search Report and Written Opinion for International Application No. PCT/US2007/016282, Mailing Date Feb. 19, 2009, 23 pages.

* cited by examiner

MOLDED PLASTIC CONTAINER AND PREFORM HAVING INSERT-MOLDED INSERT

The present disclosure relates to manufacture of molded plastic containers having a radio frequency identification (RFID) tag insert molded in a wall of the container, and to manufacture of preforms for blow molding into plastic containers and having an RFID tag insert molded into a wall of the preform.

BACKGROUND AND SUMMARY OF THE DISCLOSURE

It has been proposed to place RFID tags on or in walls of a container to confirm the genuineness of a package that includes the container and/or to provide information concerning a product within the container. Such RFID tags may be secured to a wall of the container after fabrication of the container, embedded in a wall of the container during blow molding of the container, or assembled to a container preform in such a way that the tag will be embedded in a wall of the container following blow molding of the preform. A general object of the present disclosure is to provide a method of insert molding an RFID tag into a wall of a container or a container preform, and to provide a blow molded plastic container or a molded plastic preform having an RFID tag insert molded therein.

The present disclosure embodies a number of aspects that can be implemented separately from or in combination with each other.

A method of making a plastic container having an RFID tag in a wall of the container, in accordance with one aspect of the present disclosure, includes providing a mold having a mold core and mounting an insert on the core. The insert includes an RFID tag surrounded by a plastic housing, which preferably is retained on the core for example by heat of the core partially melting the housing. A plastic preform is formed in the mold around the core and the insert, preferably by injection molding, such that the insert is embedded in a wall of the preform. The preform is then blow molded into a plastic container having the insert embedded in a wall of the container. The insert preferably is mounted on an end of the core such that the insert is in the base wall of the container following blow molding. The RFID tag preferably is externally covered by plastic material in the preform as molded, and in the container as blow molded, so that the RFID tag is not externally exposed in the preform or the container. The disclosure also contemplates a container preform and a blow molded plastic container manufactured in accordance with a method of the disclosure.

BRIEF DESCRIPTION OF THE DRAWINGS

The disclosure, together with additional objects, features, advantages and aspects thereof, will best be understood from the following description, the appended claims and the accompanying drawings, in which:

DETAILED DESCRIPTION OF PREFERRED EMBODIMENTS

Figure 1:
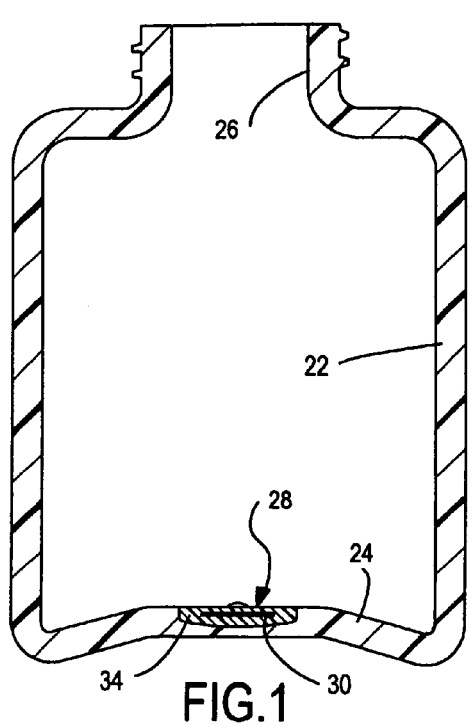
FIG. 1 is a sectional view of a blow molded plastic container in accordance with one exemplary embodiment of the present disclosure.
Figure 3:
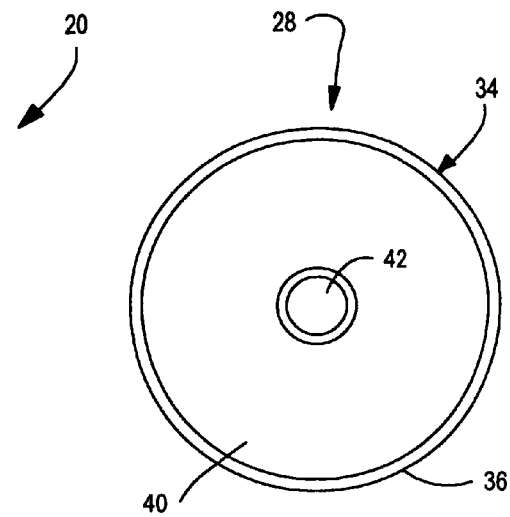
FIG. 3 is a top plan view of the insert in FIG. 2.
Figure 2:
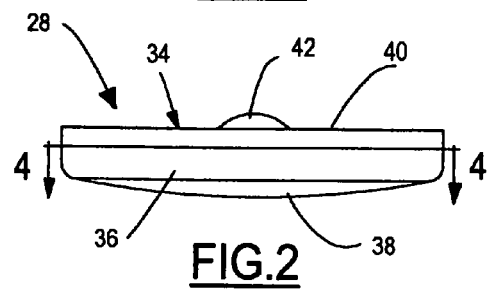
FIG. 2 is an elevational view of the RFID insert in the container of FIG. 1.
Figure 4:
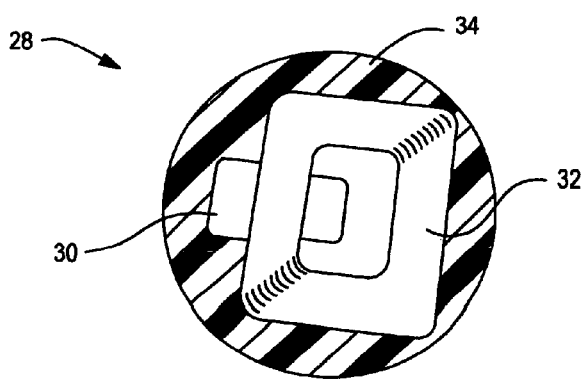
FIG. 4 is a sectional view taken substantially along the line 4-4 in FIG. 2.

FIG. 1 illustrates a blow molded plastic container 20 in accordance with an exemplary embodiment of the present disclosure. Container 20 includes a sidewall 22 that connects a base wall 24 to a neck finish 26. Sidewall 22 can be of any suitable geometry, such as cylindrical. An RFID insert 28 is insert molded into a wall of container 20, preferably base wall 24. RFID insert 28 is illustrated in greater detail in FIGS. 2-4 and includes an RFID tag 30 coupled to a radio frequency antenna 32. The combination of tag 30 and antenna 32 is embedded in a plastic housing 34, such as by being insert molded into the housing. Plastic housing 34 preferably is disk-shaped in construction, having a circular periphery 36, one outwardly domed end face 38, and a second end face 40 with a central button 42. Button 42 preferably is substantially part-spherical in contour in this embodiment. Circular periphery 36 is preferred to conform with the generally circular geometry of the closed end of a container preform. However, other peripheral geometries can be employed. Tag 30 and antenna 32 can be of any suitable construction. Housing 34 can be of any suitable plastic material such as polyethylene or polypropylene plastics.

Figure 5:
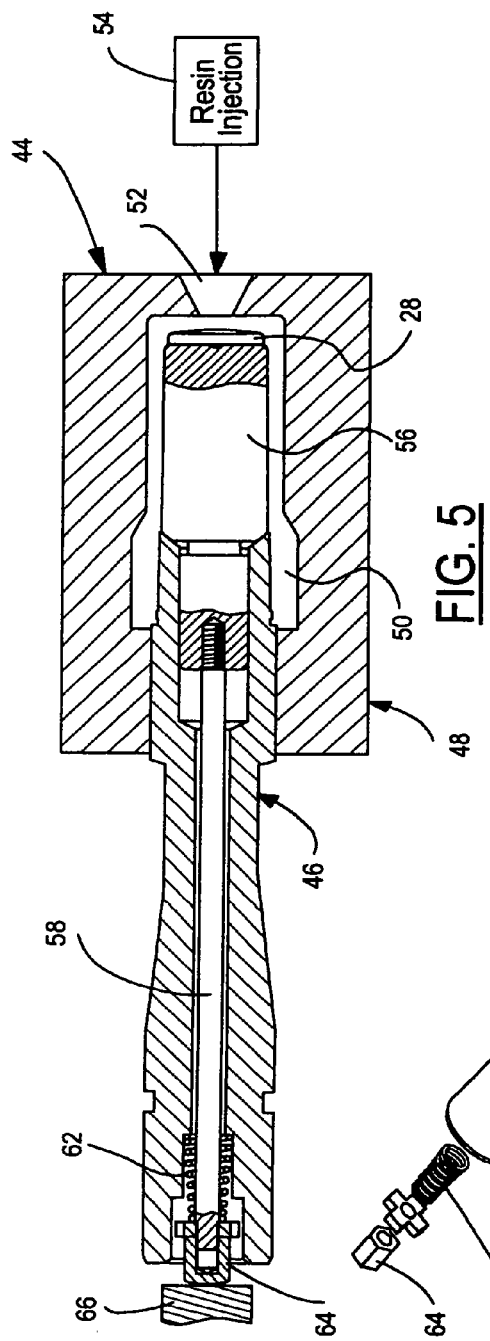
FIG. 5 is a sectional view of an apparatus for molding a container preform in accordance with one aspect of the present disclosure.
Figure 6:
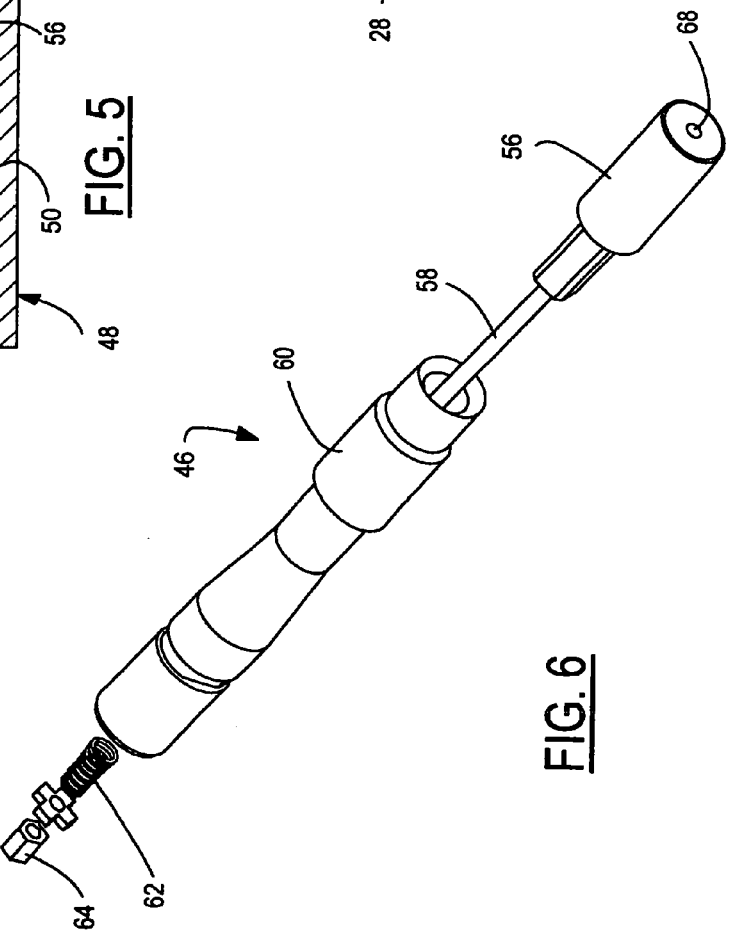
FIG. 6 is an exploded perspective view of the mold core in the apparatus of FIG. 5.

FIGS. 5-6 illustrate a mold apparatus 44 for making a preform for blow molding into container 20 in an injection blow molding operation or a reheat blow molding operation. Apparatus 44 includes a mold core 46 removably received within a female mold section 48 to form a mold cavity 50 around the core. A gate 52 in mold section 48 connects cavity 50 to an external source 54 of one or more plastic resins. Mold core 46 in this embodiment includes a core head 56 coupled to a rod 58 that extends through a core body 60. A coil spring 62 encircles the end of rod 58 remote from head 56. Spring 62 cooperates with a nut 64 received on rod 58 for biasing head 56 to a closed position against body 60 as illustrated in FIG. 5. Nut 64 may be engaged by a cam 66 to "crack" the abutment between head 56 and body 60 during blow molding. The free end of head 56 has a pocket 68 contoured to receive button 42 on plastic housing 34 of insert 28 for centering the insert on the end of core head 56. Core 46 is maintained at elevated temperature during operation so that placement of insert 28 onto the end of the core, centered by cooperation of button 42 with pocket 68, partially melts the housing of the insert at surface 40 and holds the insert on the surface of the core head.

Figure 7:
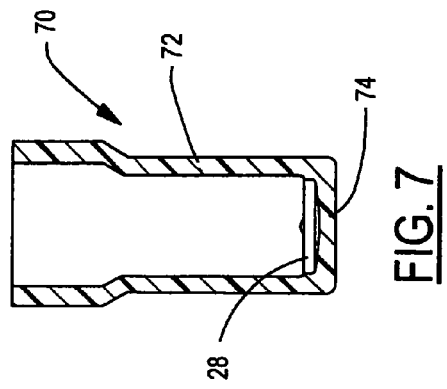
FIG. 7 is a sectional view of an exemplary container preform made in the apparatus of FIGS. 5 and 6 for blow molding the plastic container of FIG. 1.

With insert 28 so placed on the end of core head 56 and the mold apparatus closed as illustrated in FIG. 5, one or more plastic resin materials can be injected through gate 52 into mold cavity 50 to mold the preform. FIG. 7 schematically illustrates a resulting preform 70 as generally including a tubular body 72 having a closed end 74 with RFID insert 28 insert molded into closed end 74. The dimensions and geometry of mold cavity 52 preferably are such that insert 28 is externally covered by preform plastic material at closed end 74, as shown in FIG. 7. In this way, when container 20 (FIG. 1) is blow molded from preform 70 (FIG. 7), insert 28 will be externally covered by plastic material, as shown in FIG. 1. The plastic of preform 70 and container 20 can be of any suitable type, such as polyethylene terephthalate (PET). FIG. 1 illustrates container 20 being of monolayer construction, and FIG. 7 correspondingly illustrates preform 70 being of monolayer construction. However, these are for ease of illustration only, and the container preform and the container body can be made of multi-layer construction employing any suitable simultaneous or sequential injection molding technique. It also is contemplated in accordance with the broadest aspects of the disclosure that the preform could be made by compression molding, although injection molding is preferred.

Figure 8:
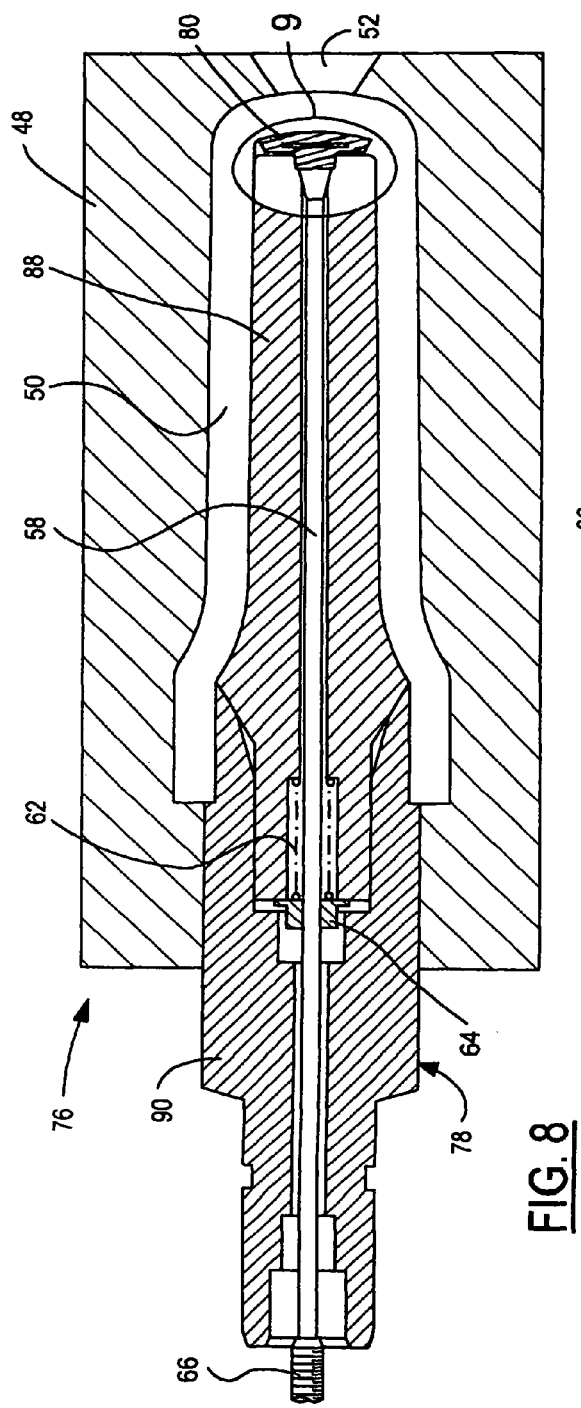
FIG. 8 is a sectional view of a preform molding apparatus that is a modification to the embodiment of FIG. 5.
Figure 9:
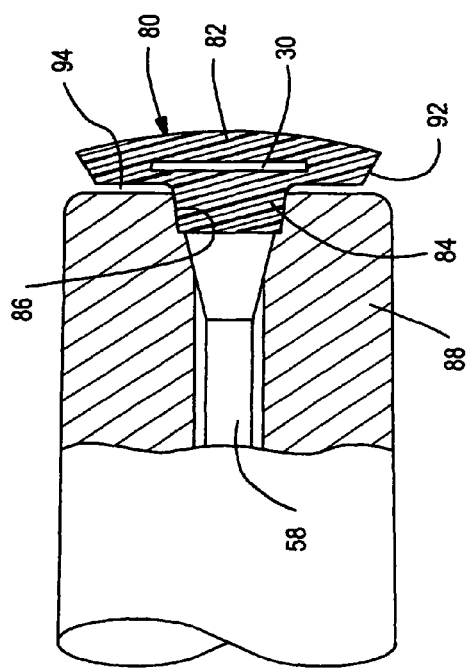
FIG. 9 is a fragmentary sectional view on an enlarged scale of the portion of FIG. 8 within the area 9.

FIGS. 8 and 9 illustrate a modification to mold apparatus 44 in FIGS. 5 and 6. In the mold apparatus 76 of FIGS. 8 and 9, a mold core 78 is received within female mold section 48 to form mold cavity 50. In this embodiment, RFID insert 80 has a plastic housing 82 with an axially extending conical plug 84. This conical plug 84 is received by press-fit within a conical opening 86 at the end of mold core head 88 to retain insert 80 on mold core 78. Rod 58 extends through head 88 and mold core body 90 to be engaged by a cam 66 to move rod 58 against the force of coil spring 62 to separate insert 80 from core head 88 during blow molding. Insert housing 82 has a conical periphery 92, and plug 84 is such that there is a slight gap 94 between housing 82 and the end of core head 88. During molding of the preform, plastic preform material will flow around conical periphery 92 into gap 94 to help retain insert 80 within the end of the preform during blow molding.

There thus have been disclosed a method of molding a plastic container having an RFID tag in a wall of the container, a method of molding a container preform having an RFID tag in a wall of the preform, a blow molded plastic container having an RFID tag insert molded and embedded in a wall of the container, and a container preform for blow molding into a plastic container having an RFID tag insert molded in the preform, which fully satisfy all of the objects and aims previously set forth. The disclosure has been presented in conjunction with several exemplary embodiments, and a number of modifications and variations have been discussed. Other modifications and variations readily will suggest themselves to persons of ordinary skill in the art in view of the foregoing discussion. For example, although the disclosure has been presented in conjunction with injection molded preforms and injection blow molded containers, the subject matter of the disclosure could as readily be implemented in a reheat blow molding operation in which the preforms are made by injection molding or even compression molding. The RFID insert could be insert molded into the sidewall of the preform, although the end wall of the preform is preferred. The disclosure is intended to embrace all such modifications and variations as fall within the spirit and broad scope of the appended claims.

The invention claimed is:

1. A method of making a plastic container having an insert in a wall of the container, which includes the steps of:
   (a) providing a mold that includes a mold core and a female mold section,
   (b) mounting an insert on said core wherein said insert includes a plastic housing and is retained on said core, and closing said mold to form a mold cavity around said core,
   (c) forming a plastic preform in said mold cavity around said mold core and said insert such that said insert is embedded in a wall of said preform, wherein said insert is externally covered by plastic material of said preform so that said insert is not externally exposed, and
   (d) blow molding said preform into a plastic container having said insert embedded in a wall of the container, wherein said step (b) includes mounting said insert on an end of said core such that said insert is in a closed end of said preform following step (c) and in a base wall of the container following said step (d), wherein temperature of said core is such that said core partially melts said plastic housing wherein said insert is retained on said core following said step (b).

2. The method set forth in claim 1 wherein said step (c) includes injection molding said plastic preform in said mold around said core and said insert.

3. A method of making a plastic container having an insert in a wall of the container, which includes the steps of:
   (a) providing a mold that includes a mold core and a female mold section,
   (b) mounting an insert on said core wherein said insert is retained on said core, and closing said mold to form a mold cavity around said core,
   (c) forming a plastic preform in said mold cavity around said mold core and said insert such that said insert is embedded in a wall of said preform, wherein said insert is externally covered by plastic material of said preform so that said insert is not externally exposed, and
   (d) blow molding said preform into a plastic container having said insert embedded in a wall of the container, wherein said step (b) includes mounting said insert on an end of said core such that said insert is in a base wall of the container following said step (d), wherein said step (a) includes providing an ejection rod on said core, and wherein said step (d) includes activating said ejection rod to facilitate separation of said insert from said core during blow molding.

4. The method set forth in claim 1 wherein said insert includes an RFID tag coupled to an rf antenna within said plastic housing.

5. The method set forth in claim 3 wherein said core has a conical opening at an end of said core, and wherein said insert has a conical plug that is inserted into said opening during said step (b).

6. A method of making a plastic container preform having an insert in a wall of the preform, which includes the steps of:
   (a) providing a mold that includes a mold core and a female mold section,
   (b) mounting an insert on said core wherein said insert includes a plastic housing and is retained on said core, and closing said mold to form a mold cavity around said core, and
   (c) forming a plastic preform in said mold cavity around said core and said insert such that said insert is embedded in a wall of said preform wherein said insert is externally covered by plastic material of said preform so that said insert is not externally exposed, wherein said step (b) includes mounting said insert on an end of said core such that said insert is in a closed end of said preform following said step (c) and in a base wall of the container following blow molding of said preform, wherein temperature of said core is such that said core partially melts said plastic housing wherein said insert is retained on said core following said step (b).

7. A method of making a plastic container having an insert in a wall of the container, which includes the steps of:
   (a) providing a mold that includes a mold core having an ejection rod, and a female mold section, (b) mounting an insert on said core wherein said insert is retained on said core, and closing said mold to form a mold cavity around said core, and (c) forming a plastic preform in said mold cavity around said mold core and said insert such that said insert is embedded in a wall of said preform, wherein said insert is externally covered by plastic material of said preform so that said insert is not externally exposed, wherein said step (b) includes mounting said insert on an end of said core such that said insert is in a closed end of said preform following said step (c) and in a base wall of the container following blow molding of said preform, and said ejection rod is activatable to facilitate separation of said insert from said core.

8. The method set forth in claim 7 wherein said step (c) includes injection molding said plastic preform in said mold around said core and said insert.

9. The method set forth in claim 7 including (d) blow molding said preform into a container having said insert embedded in said base wall of said container, and activating said ejection rod to facilitate separation of said insert from said core during said blow molding.

10. The method set forth in claim 6 wherein said insert includes an RFID tag within a plastic housing.

11. The method set forth in claim 3 wherein said insert is retained on said mold core by press fit.

12. The method set forth in claim 7 wherein said insert is retained on said mold core by press fit.

13. A method of making a plastic container, which includes the steps of:
(a) providing a mold that includes a mold core having an ejection rod, and a female mold section,
(b) mounting an insert on an end of said core wherein said insert is retained on said core, and closing said mold to form a mold cavity around said core,
(c) forming a plastic preform in said mold cavity around said mold core and said insert such that said insert is embedded in a closed end of said preform, wherein said insert is externally covered by plastic material of said preform so that said insert is not externally exposed, and
(d) blow molding said preform into a plastic container having said insert embedded in a base wall of the container, and activating said ejection rod during the blow molding step to facilitate separation of said insert from said core.

14. The method set forth in claim 13 wherein said insert is retained on said mold core by press fit.

15. The method set forth in claim 13 wherein said step (c) includes injection molding said plastic preform in said mold into a gap between said mold core and said insert to help retain said insert within said closed end of said preform.

16. The method set forth in claim 1 wherein said step (c) includes injection molding said plastic preform in said mold into a gap between said core and said insert to help retain said insert within said closed end of said preform.

17. The method set forth in claim 3 wherein said step (c) includes injection molding said plastic preform in said mold into a gap between said core and said insert to help retain said insert within said wall of said preform.

18. The method set forth in claim 6 wherein said step (c) includes injection molding said plastic preform in said mold into a gap between said core and said insert to help retain said insert within said closed end of said preform.

19. The method set forth in claim 7 wherein said step (c) includes injection molding said plastic preform in said mold into a gap between said core and said insert to help retain said insert within said wall of said preform.

* * * * *